US012730886B2

(12) United States Patent
Hosomi

(10) Patent No.: US 12,730,886 B2
(45) Date of Patent: Sep. 8, 2026

(54) INFORMATION VISUALIZATION APPARATUS, INFORMATION VISUALIZATION METHOD, AND COMPUTERREADABLE RECORDING MEDIUM

(71) Applicant: NEC Corporation, Tokyo (JP)

(72) Inventor: Itaru Hosomi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 112 days.

(21) Appl. No.: 18/569,289

(22) PCT Filed: Jun. 16, 2021

(86) PCT No.: PCT/JP2021/022890
§ 371 (c)(1),
(2) Date: Dec. 12, 2023

(87) PCT Pub. No.: WO2022/264317
PCT Pub. Date: Dec. 22, 2022

(65) Prior Publication Data
US 2024/0273197 A1 Aug. 15, 2024

(51) Int. Cl.
*G06F 21/55* (2013.01)

(52) U.S. Cl.
CPC .................................. *G06F 21/554* (2013.01)

(58) Field of Classification Search
CPC ..... G06F 21/554; G06F 21/55; H04W 12/128
USPC ........................................................... 726/23
See application file for complete search history.

(56) References Cited

U.S. PATENT DOCUMENTS 8,881,288 B1 11/2014 Levy et al.
11,363,057 B1 * 6/2022 Talbot ..................... H04L 41/22
2007/0192474 A1 * 8/2007 Decasper .............. H04L 67/306 709/223
2011/0277034 A1 * 11/2011 Hanson ................. G06F 21/554 709/224
2014/0181968 A1 * 6/2014 Ge ...................... H04L 63/1416 726/23

(Continued)

FOREIGN PATENT DOCUMENTS

CN 104539626 A 4/2015
JP H11-259331 A 9/1999

(Continued)

OTHER PUBLICATIONS

Written opinion for PCT Application No. PCT/JP2021/022890, mailed on Sep. 14, 2021 with English translation.

(Continued)

*Primary Examiner* — Meng Vang
(74) *Attorney, Agent, or Firm* — Sughrue Mion, PLLC

(57) ABSTRACT

An information visualization apparatus includes: an inference unit that infers, using observation data representing events observed at a time of a cyber attack to a computer system and inferential knowledge, details of the cyber attack; a location specification unit that specifies locations at which the events have been observed in the computer system, from the observation data; a graph generation unit that generates a directed graph in which the specified locations are nodes, and edges are set between the nodes based on the observation data or the inferred details; and a graph display unit that displays the directed graph.

3 Claims, 10 Drawing Sheets

(56) References Cited

U.S. PATENT DOCUMENTS

| | | | | |
|---|---|---|---|---|
| 2021/0058428 | A1* | 2/2021 | Arlitt | H04L 63/1416 |
| 2021/0112090 | A1* | 4/2021 | Rivera | H04L 63/1425 |
| 2021/0211438 | A1* | 7/2021 | Trim | G06N 20/00 |
| 2021/0350248 | A1* | 11/2021 | Rogers | G06N 5/027 |
| 2022/0247759 | A1* | 8/2022 | Wang | H04L 63/145 |

FOREIGN PATENT DOCUMENTS

| | | | |
|---|---|---|---|
| WO | 2014/112185 | A1 | 7/2014 |
| WO | 2015/140842 | A1 | 9/2015 |
| WO | 2015/140843 | A1 | 9/2015 |
| WO | 2016/072310 | A1 | 5/2016 |
| WO | 2017/175283 | A1 | 10/2017 |
| WO | 2018/079439 | A1 | 5/2018 |
| WO | 2019/011060 | A1 | 1/2019 |
| WO | 2019/186777 | A1 | 10/2019 |

OTHER PUBLICATIONS

JP Official Communication for JP Application No. 2023-528844, mailed on Apr. 8, 2025 with English Translation.

International Search Report for PCT Application No. PCT/JP2021/022890, mailed on Sep. 14, 2021.

Capobianco, F et al., "Employing Attack Graphs for Intrusion Detection", Proceedings of the New Security Paradigms Workshop, Sep. 2019, pp. 16-30, <DOI:10.1145/3368860.3368862>, p. 16, Abstract, p. 22, 5 Research Problems, p. 27, Figure 3.

Wu, S., Zhang, Y. and Cao, W., "Network security assessment using a semantic reasoning and graph based approach", Computers and Electrical Engineering., Feb. 21, 2017, vol. 64, pp. 96-109, <DOI:10.1016/j.compeleceng.2017.02.001>, 3. System overview, 5. Security assessment using semantic reasoning.

* cited by examiner

Fig.4

OBSERVATION DATA (OPERATION LOGS)

```
emailReceived( “10:21:35” ,  “alice” ,  “hoge” )
openFile( “10:23:18” ,  “alice” ,  “NOTIFICATION.pdf” )
exeFileCreated( “10:23:21” ,  “alice” ,  “ImVerySafe.exe” )
remoteLogon( “23:29:04” ,  “alice” ,  “bob” )
remoteLogon( “23:30:05” ,  “alice” ,  “host5” )
exeFileCreated( “23:39:52” ,  “bob” ,  “ImVerySafe.exe” )
queryRegistory( “23:58:14” ,  “bob” ,  “ImVerySafe.exe” )

<RESULT OF SOME ANALYSIS PERFORMED ON DATA>
isUnknownSender( “hoge” ,  “foo1@example.com” )
hasAttachedFile( “hoge” ,  “NOTIFICATION.pdf” )
vulnerableProgramExecuted( “10:23:19” ,  “alice” ,  “hogePDF.exe” )
isAbnormalWorkTime( “23:29:04” )
isAbnormalWorkTime( “23:30:05” )
```

Fig.5

INFERENTIAL KNOWLEDGE 1. emailReceived(time, host, emailId) ∧ isUnknownSender(emailId, sender) ∧ hasAttachedFile(emailId, file) ⇒ suspiciousFileReceived (time, host, file)

2. vulnerableProgramExecuted(time1, host, program) ∧ exeFileCreated(time2, host, file) ⇒ suspiciousExeCreated(time2, host, file)

3. suspiciousFileReceived(time1, host, "NOTIFICATION.pdf") ∧ openFile(time2, host, file) ∧ suspiciousExeCreated(time3, host, file) ⇒ malwareInjected(time3, host)

4. remoteLogon(time, host1, host2) ∧ isAbnormalWorkTime(time) ⇒ suspiciousLogon(time, host1, host2)

5. malwareInjected(time1, host1) ∧ exeFileCreated(time2, host2, file) ∧ suspiciousLogon(time3, host1, host2) ⇒ lateralMovement(time3, host1, host2)

6. malwareDetectedByAV(time2, host, data) ⇒ malwareInjected(time2, host)

7. taskScheduled(time1, source, task) ∧ hasExternalHostInTask(time1, host2, task) ⇒ lateralMovement(time1, host1, host2)

8. malwareInjected(time1, host, program) ∧ queryRegistory(time2, host, program) ⇒ resourceDiscovery(time2, host)

9. lateralMovement(time1, host1, host2) ∧ queryRegistory(time2, host2, program) ⇒ resourceDiscovery(time2, host2)

Fig.6

RESULT OF INFERENCE

① emailReceived( “10:21:35” , “alice” , “hoge” ) ∧ isUnknownSender( “hoge” , “foo1@example.com” ) ∧ hasAttachedFile( “hoge” , “NOTIFICATION.pdf” ) ⇒ suspiciousFileReceived ( “10:21:35” , “alice” , “NOTIFICATION.pdf” )

② vulnerableProgramExecuted( “10:23:19” , “alice” , “hogePDF.exe” ) ∧ exeFileCreated( “10:23:21” , “alice” , “ImVerySafe.exe” ) ⇒ suspiciousExeCreated( “10:23:21” , “alice” , “ImVerySafe.exe” )

③ suspiciousFileReceived( “10:21:35” , “alice” , “NOTIFICATION.pdf” ) ∧ openFile( “10:23:18” , “alice” , “NOTIFICATION.pdf” ) ∧ suspiciousExeCreated( “10:23:21” , “alice” , “ImVerySafe.exe” ) ⇒ malwareInjected( “10:23:21” , “alice” )

④ remoteLogon( “23:29:04” , “alice” , “bob” ) ∧ isAbnormalWorkTime( “23:29:04” ) ⇒ suspiciousLogon( “23:29:04” , “alice” , “bob” )

⑤ malwareInjected( “10:23:21” , “alice” ) ∧ exeFileCreated( “23:39:52” , “bob” , “ImVerySafe.exe” ) ∧ suspiciousLogon( “23:29:04” , “alice” , “bob” ) ⇒ lateralMovement( “23:39:52” , “alice” , “bob” )

⑥ lateralMovement( “23:39:52” , “alice” , “bob” ) ^ queryRegistory( “23:58:14” , “bob” , “ImVerySafe.exe” ) ⇒ resourceDiscovery(( “23:58:14” , “bob” )

Fig.7

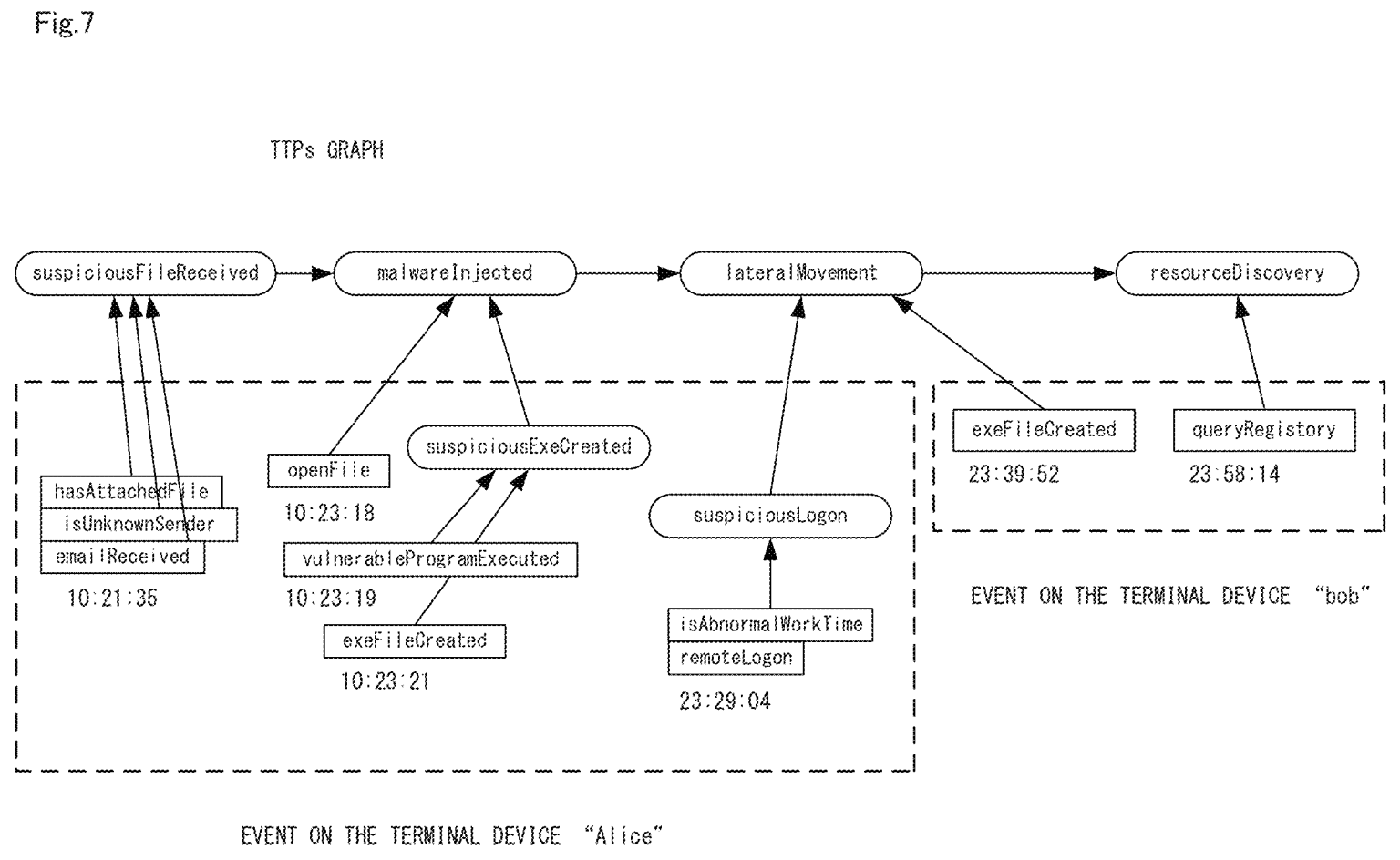

TTPs GRAPH suspiciousFileReceived malwareInjected lateralMovement resourceDiscovery hasAttachedFile isUnknownSender emailReceived

10:21:35 openFile

10:23:18 suspiciousExeCreated vulnerableProgramExecuted

10:23:19 exeFileCreated

10:23:21 suspiciousLogon isAbnormalWorkTime remoteLogon

23:29:04

EVENT ON THE TERMINAL DEVICE "Alice"

exeFileCreated

23:39:52 queryRegistory

23:58:14

EVENT ON THE TERMINAL DEVICE "bob"

DIRECTED GRAPH

INFORMATION VISUALIZATION APPARATUS, INFORMATION VISUALIZATION METHOD, AND COMPUTERREADABLE RECORDING MEDIUM

This application is a National Stage Entry of PCT/JP2021/022890 filed on Jun. 16, 2021, the contents of all of which are incorporated herein by reference, in their entirety.

TECHNICAL FIELD

The present invention relates to an information visualization apparatus and an information visualization method for enabling to take a countermeasure against cyberattacks, and further relates to a computer-readable recording medium having recorded thereon a program for realizing the apparatus and method.

BACKGROUND ART

In recent years, in organizations such as corporations and society, the role of computer systems is becoming more important. Therefore, the threat of a cyberattack to confidential information management by a computer system is becoming more severe. Also, such a cyberattack makes an advance in an organization while increasing the intrusion range, and therefore it is important to notice the cyberattack quickly, understand the details of the attack by software (malware, virus, etc.) intruded by the cyberattack, and take a necessary countermeasure as soon as possible.

Therefore, Patent Document 1 discloses an apparatus that extracts routes of series of (chain) attacks across an apparatus group that constitutes a system, as the details of the attacks, and analyzes threats envisioned in the system, for example. Specifically, the apparatus disclosed in Patent Document 1 first represents the relationships between apparatuses by means of a graph from a network configuration diagram that has been input, traces envisioned infection routes of a computer virus or the like on the graph, and specifies the attack route. Next, the apparatus disclosed in Patent Document 1 searches a database that stores attack purposes and attack cases in cyberattacks using the conditions of the apparatuses (types, statuses, and the like of the apparatuses) as a query, and displays the search result and the specified attack route in an associated manner.

LIST OF RELATED ART DOCUMENTS

Patent Document

Patent Document 1: International Publication No. WO/2019/011060

SUMMARY OF INVENTION

Problems to be Solved by the Invention

According to the apparatus disclosed in Patent Document 1, when a system is attacked, the attack route and a related attack case are displayed, and therefore a system administrator can take a countermeasure based on the past cases.

However, the information displayed by the apparatus disclosed in Patent Document 1 is not a result of analyzing a specific attack that the system has received, and therefore a system administrator cannot directly understand the details of the actual attack with the apparatus. With the apparatus disclosed in Patent Document 1, it is difficult for the administrator to take a necessary countermeasure quickly when the system is attacked.

An example object of the invention is to provide an information visualization apparatus, an information visualization method, and a computer-readable recording medium with which the details of a cyberattack can be visualized.

Means for Solving the Problems

In order to achieve the above-described object, an information visualization apparatus includes:

an inference unit that infares, using observation data representing events observed at a time of a cyberattack to a computer system and inferential knowledge, details of the cyberattack;

a location identification unit that identifies locations at which the events have been observed in the computer system, from the observation data;

a graph generation unit that generates a directed graph in which the specified locations are nodes, and edges are set between the nodes based on the observation data or the inferred details; and a graph display unit that displays the directed graph.

In order to achieve the above-described object, an information visualization method includes:

an inference step of inferring, using observation data representing events observed at a time of a cyberattack to a computer system and inferential knowledge, details of the cyberattack;

a location identification step of specifying locations at which the events have been observed in the computer system, from the observation data;

a graph generation step of generating a directed graph in which the specified locations are nodes, and edges are set between the nodes based on the observation data or the inferred details; and a graph display step of displaying the directed graph.

In order to achieve the above-described object, a computer readable recording medium according to an example aspect of the invention is a computer readable recording medium that includes recorded thereon a program, the program including instructions that cause the computer to carry out:

an inference step of inferring, using observation data representing events observed at a time of a cyberattack to a computer system and inferential knowledge, details of the cyberattack;

a location identification step of specifying locations at which the events have been observed in the computer system, from the observation data;

a graph generation step of generating a directed graph in which the specified locations are nodes, and edges are set between the nodes based on the observation data or the inferred details; and a graph display step of displaying the directed graph.

Advantageous Effects of the Invention

As described above, according to the invention, it is possible to visualize the details of a cyberattack.

BRIEF DESCRIPTION OF THE DRAWINGS

FIG. 4 is a diagram illustrating an example of the observation data to be used in the specific example.

FIG. 5 is a diagram illustrating an example of the inferential knowledge to be used in the specific example.

FIG. 6 is a diagram illustrating an example of the result (hypothesis) of inference executed in the specific example.

FIG. 7 is a diagram illustrating an example of the TTPs graph obtained from the inference result illustrated in FIG. 6.

EXAMPLE EMBODIMENT

Example Embodiment

Hereinafter, an information visualization apparatus, an information visualization method, and a program in an example embodiment will be described with reference to FIGS. 1 to 10.

Apparatus Configuration

Figure 1:
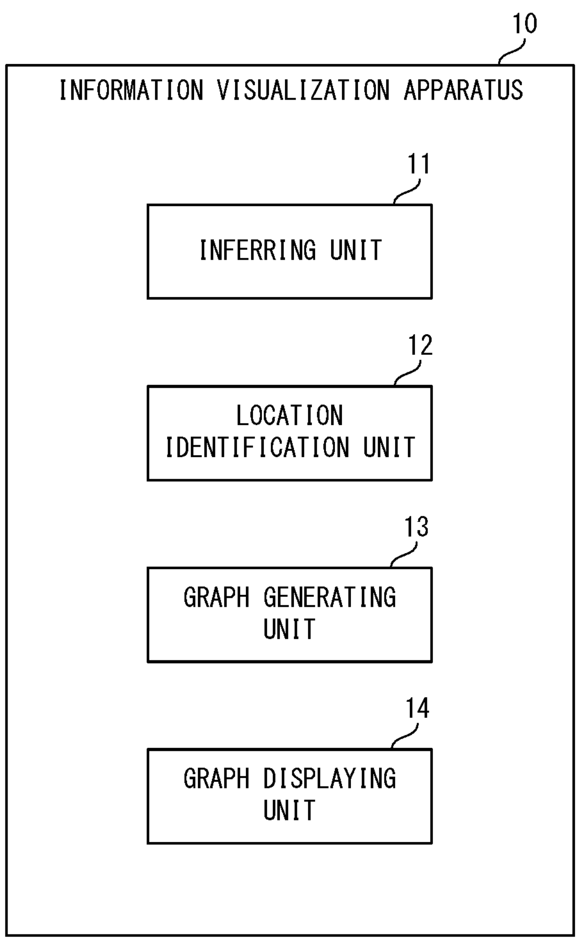
FIG. 1 is a configuration diagram illustrating a schematic configuration of the information visualization apparatus in the example embodiment.

First, a schematic configuration of the information visualization apparatus in the example embodiment will be described using FIG. 1. FIG. 1 is a configuration diagram illustrating a schematic configuration of the information visualization apparatus in the example embodiment.

The information visualization apparatus 10, illustrated in FIG. 1, in the example embodiment is an apparatus for visualizing details of a cyberattack to a computer system in order to make taking a countermeasure against the cyberattack easy. As illustrated in FIG. 1, the information visualization apparatus 10 includes an inferring unit 11, a location identification unit 12, a graph generating unit 13, and a graph displaying unit 14.

The inferring unit 11 infers details of a cyberattack using observation data representing events observed at a time of the cyberattack and inferential knowledge. The location identification unit 12 identifies locations at which the events have been observed in the computer system, from the observation data.

The graph generating unit 13 generates a directed graph in which the specified locations are nodes, and edges are set between the nodes based on the observation data or inferred details. The graph displaying unit 14 displays the generated directed graph.

As described above, when a cyberattack is observed, the information visualization apparatus 10 can infer the details of the cyberattack, specify the locations at which observation is made, further generate a directed graph using the inference result and the specified locations, and display the generated directed graph. Therefore, according to the information visualization apparatus 10, when a computer system receives a cyberattack, the details of the attack can be visualized.

Figure 2:
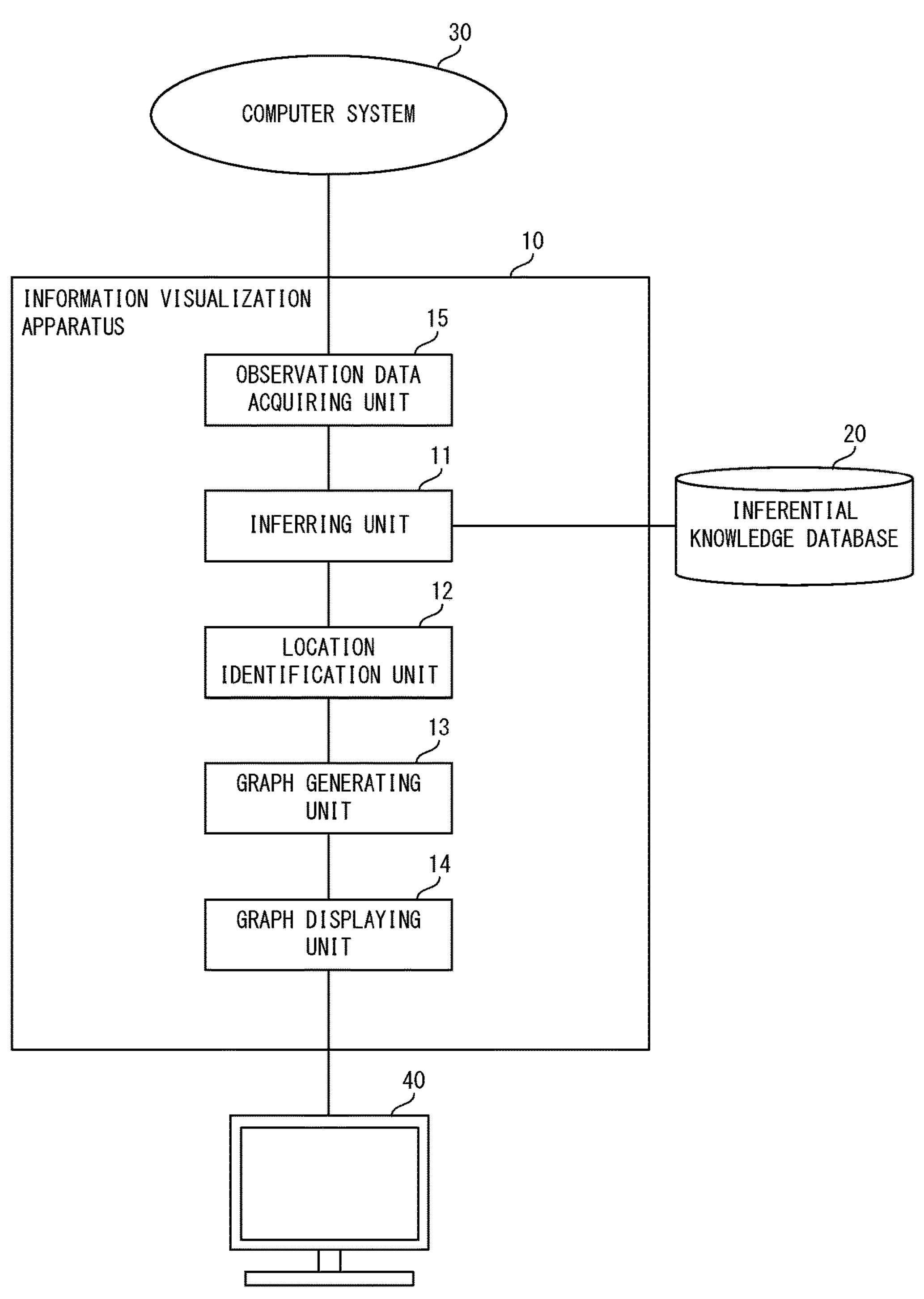
FIG. 2 is a configuration diagram specifically illustrating the configuration of the information visualization apparatus in the example embodiment.

Next, the configuration and functions of the information visualization apparatus in the example embodiment will be specifically described using FIG. 2. FIG. 2 is a configuration diagram specifically illustrating the configuration of the information visualization apparatus in the example embodiment.

As illustrated in FIG. 2, in the example embodiment, the information visualization apparatus 10 is connected to a computer system 30. The computer system 30 is constructed by a plurality of terminal devices that are connected via a network. When the computer system 30 receives a cyberattack, the information visualization apparatus 10 visualizes the details of the 5 cyberattack.

Also, as illustrated in FIG. 2, the information visualization apparatus 10 includes an observation data acquiring unit 15 in addition to the aforementioned inferring unit 11, location identification unit 12, graph generating unit 13, and graph displaying unit 14.

The observation data acquiring unit 15 acquires observation data at the time of cyberattack from the computer system 30. Specifically, the observation data acquiring unit 15 acquires operation logs of the terminals that constitute the computer system 30, and acquires data in a setting format in which acquired operation logs, information regarding the acquisition source terminals, time information, and the like are compiled, as the observation data. Assume that an event in which a terminal "alice" received an e-mail specified by identification information "hoge" at 10:21:35 occurred, for example, and the observation data acquiring unit 15 has acquired an operation log representing this event. In this case, the observation data acquiring unit 15 creates data in a format of "emailReceived("10:21:35", "alice", "hoge")", and acquires this data as observation data. A first-order predicate logic formula is adopted as the data setting format, and the observation data is constituted by a predicate name and arguments in parentheses. Also, the combination of the predicate and parentheses is also denoted as a "literal" below.

In the example embodiment, the inferring unit 11 acquires, from an inferential knowledge database 20, inferential knowledge stored therein. In the example in FIG. 2, the inferential knowledge database 20 is a database outside the information visualization apparatus 10, but may be a database included in the information visualization apparatus 10.

In the example embodiment, the inferential knowledge is expressed in a format of "previous state (premise)∧action (achievement state thereof)⇒following state (consequence)", for example. This format indicates that if the previous state, which is a premise, and the action (achievement state thereof) are both true, the following state, which is an inevitable consequence, is derived. In this format, the previous state and the action are necessary conditions for the following state holding true. "previous state∧action" is a sufficient condition for the following state holding true. The action can also be expressed by a conjunction of a plurality of propositions. For example, the knowledge data may also be expressed as "previous state∧action 1∧action 2⇒following state".

Specific examples of the inferential knowledge include "malware intrusion (Event1, Mal)∧unauthorized logon (Event2, Host, Host1)⇒infection spread (Plan, Mal, Host1)". In this case, Event1, Mal, Host, and the like are variables referred to as "arguments" of the predicates. The logic formula in which specific values are assigned to the "arguments" is referred to as an "observation". Examples thereof include "unauthorized logon ("e1", "10.23.123.1")".

Then, in the example embodiment, the inferring unit 11 obtains a hypothesis by applying the inferential knowledge acquired from the inferential knowledge database to the observation data acquired by the observation data acquiring unit 15. The obtained hypothesis corresponds to the details of the cyberattack, specifically a tactic, a technique, and a procedure of the cyberattack. The tactic, technique, and procedure are also collectively denoted as "TTPs" below. Moreover, the inferring unit 11 represents TTPs obtained by inference, by means of a graph. TTPs represented by means of a graph are denoted as a "TTPs graph" below.

In the example embodiment, the location identification unit 12 identifies locations at which events have been observed using observation data that is the reason of the tactic or observation data that is the reason of the technique. Also, upon specifying the locations at which the events have been observed using observation data that is the reason of the technique, the location identification unit 12 associates the specified locations with the technique whose reason is this observation data. Moreover, in this case, the location identification unit 12 also associates the tactic to which the technique associated with the observation data corresponds, with the specified locations.

The graph generating unit 13 generates a directed graph in which the specified locations are nodes while referring to the aforementioned TTPs graph. Moreover, in the example embodiment, the graph generating unit 13 sets edges between the nodes based on observation data including information representing two or more locations, or the inferred procedure. Specifically, the graph generating unit 13 generates a directed graph representing relationships between two or more locations using one piece of observation data related to the two or more locations, that is, observation data that is the reason of a technique for achieving the tactic while moving between terminal devices, for example.

In the example embodiment, the graph displaying unit 14 displays the directed graph on a screen of the display device 40 in a state in which, to each node, a tactic or a technique whose reason is observation data used for specifying the location of the node is added. Also, the graph displaying unit 14 can also display the directed graph on a screen of a terminal device connected to the information visualization apparatus 10 via a network.

Also, the graph displaying unit 14 can display, for each node or tactic in the directed graph, corresponding observation data. Moreover, the graph displaying unit 14 can also display, when the directed graph is displayed, a time axis on the screen, and display a node on this time axis based on time information included in the observation data used for specifying the node.

Apparatus Operations

Figure 3:
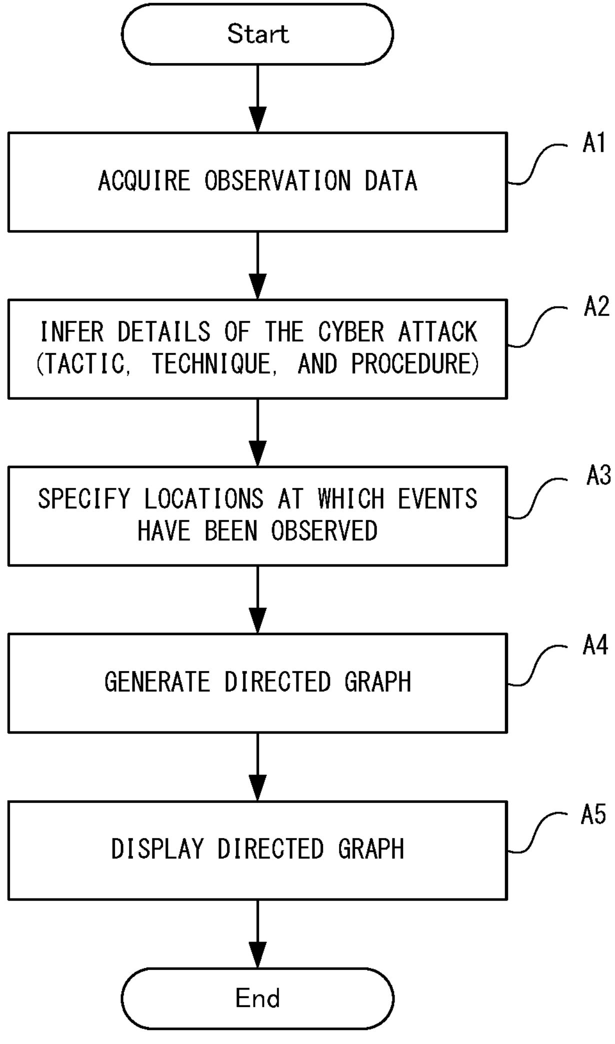
FIG. 3 is a diagram illustrating a flow diagram of the operations of the information visualization apparatus of the example embodiment.

Next, operations of the information visualization apparatus 10 in the example embodiment will be described using FIG. 3. FIG. 3 is a diagram illustrating a flow diagram of the operations of the information visualization apparatus of the example embodiment. In the following description, FIGS. 1 and 2 will be referred to as appropriate. Furthermore, in the example embodiment, an information visualization method is implemented by causing the information visualization apparatus 10 to operate. Accordingly, the following description of the operations of the information visualization apparatus 10 replaces the description of the information visualization method in the example embodiment.

As illustrated in FIG. 3, first, the observation data acquiring unit 15 acquires observation data at a time of cyberattack from the computer system 30 (step A1). Specifically, the observation data acquiring unit 15 acquires, for each operation performed by software on terminals that constitute the computer system 30, an operation log indicating the operation, and creates data in a setting format from the acquired operation logs, information regarding the terminal devices, time information, and the like. Also, the observation data acquiring unit 15 acquires the created data as observation data.

Next, the inferring unit 11 acquires inferential knowledge from the inferential knowledge database 20, and infers the tactic, technique, and procedure, which are the details of the cyberattack, by applying the acquired inferential knowledge to the observation data acquired in step A1 (step A2).

Next, the location identification unit 12 identifies locations at which events have been observed using observation data that is evidence of the tactic obtained by inferring or observation data that is evidence of the technique obtained by inferring (step A3). Specifically, the location identification unit 12 identifies terminal devices at which events have been observed using the observation data.

Next, the graph generating unit 13 generates a directed graph in which locations specified in step A3 are nodes (step A4). Also, in step A4, the graph generating unit 13 sets edges between the nodes based on observation data including information representing two or more locations, or an inferred procedure.

Next, in the example embodiment, the graph displaying unit 14 displays the directed graph in a state in which, to each node, the tactic or technique whose reason is the observation data used for specifying the location of the node is added (step A5).

In step A5, the graph displaying unit 14 can also display corresponding observation data for each node or tactic in the directed graph. Moreover, when displaying the directed graph, the graph displaying unit 14 can also display a time axis on a screen, and can display a node on the time axis based on time information included in the observation data used for specifying the node.

Specific Example

Here, a specific example of the operations of the information visualization apparatus 10 in the example embodiment will be described using FIGS. 4 to 9. Also, the specific example will be described following the steps illustrated in FIG. 3 described above.

Step A1

The observation data acquiring unit 15 acquires operation logs from the terminals that constitute the computer system 30, and creates data in a setting format from the acquired operation logs, information regarding the terminals, time information, and the like. Also, the observation data acquiring unit 15 acquires the created data as observation data. The specific example of the observation data is as illustrated in FIG. 4. Also, the device from which the observation data is acquired may also be a router, a switching hub, or the like, other than the terminal devices. FIG. 4 is a diagram illustrating an example of the observation data to be used in the specific example.

Step A2

The inferring unit 11 executes inference by applying the inferential knowledge illustrated in FIG. 5 to the operation logs acquired in step A1, and obtains a hypothesis illustrated in FIG. 6. FIG. 5 is a diagram illustrating an example of the inferential knowledge to be used in the specific example. FIG. 6 is a diagram illustrating an example of the result (hypothesis) of inference executed in the specific example.

Next, the inferring unit 11 sets a lowest layer by a portion, of the hypothesis, that represents the observed events, sets event layers higher than the lowest layer using consequences included in the rules representing the relationships between the events, and with this, constructs a hierarchical structure of events. The constructed hierarchical structure is a TTPs graph. FIG. 7 is a diagram illustrating an example of the TTPs graph obtained from the inference result illustrated in FIG. 6.

Specifically, in the example in FIG. 7, the inferring unit 11 sets the lowest layer in the hierarchical structure of events by the following portion, of the hypothesis illustrated in FIG. 6, that represents events.

"hasAttachedFile"
"isUnknownSender"
"emailReceived"
"openFile"
"vulnerableProgramExecuted"
"exeFileCreated"
"isAbnormalWorkTime"
"remoteLogon"
"exeFileCreated"
"queryRegistory"

Also, the inferring unit 11 sets the layers higher than the lowest layer in the hierarchical structure of events using the following consequences included in the inferential knowledge illustrated in FIG. 5.

"suspiciousFileReceived"
"malwareInjected"
"suspiciousExeCreated"
"lateralMovement"
"suspiciousLogon"
"resourceDiscovery"

Step A3

The location identification unit 12 identifies, out of the observation data illustrated in FIG. 4, observation data that is the reason of a tactic or observation data that is the reason of a technique, and identifies the location at which an event has been observed based on the name of a terminal (hereinafter, denoted as a "host name") included in the specified observation data or an IP address. For example, if the observation data is aforementioned "emailReceived("10:21:35", "alice", "hoge")", the host name "alice" has received an e-mail specified by the identification information "hoge", and therefore the host name "alice" is specified as a location. In FIG. 7, broken lines indicate observation events for each terminal device.

Step A4

Figure 8:
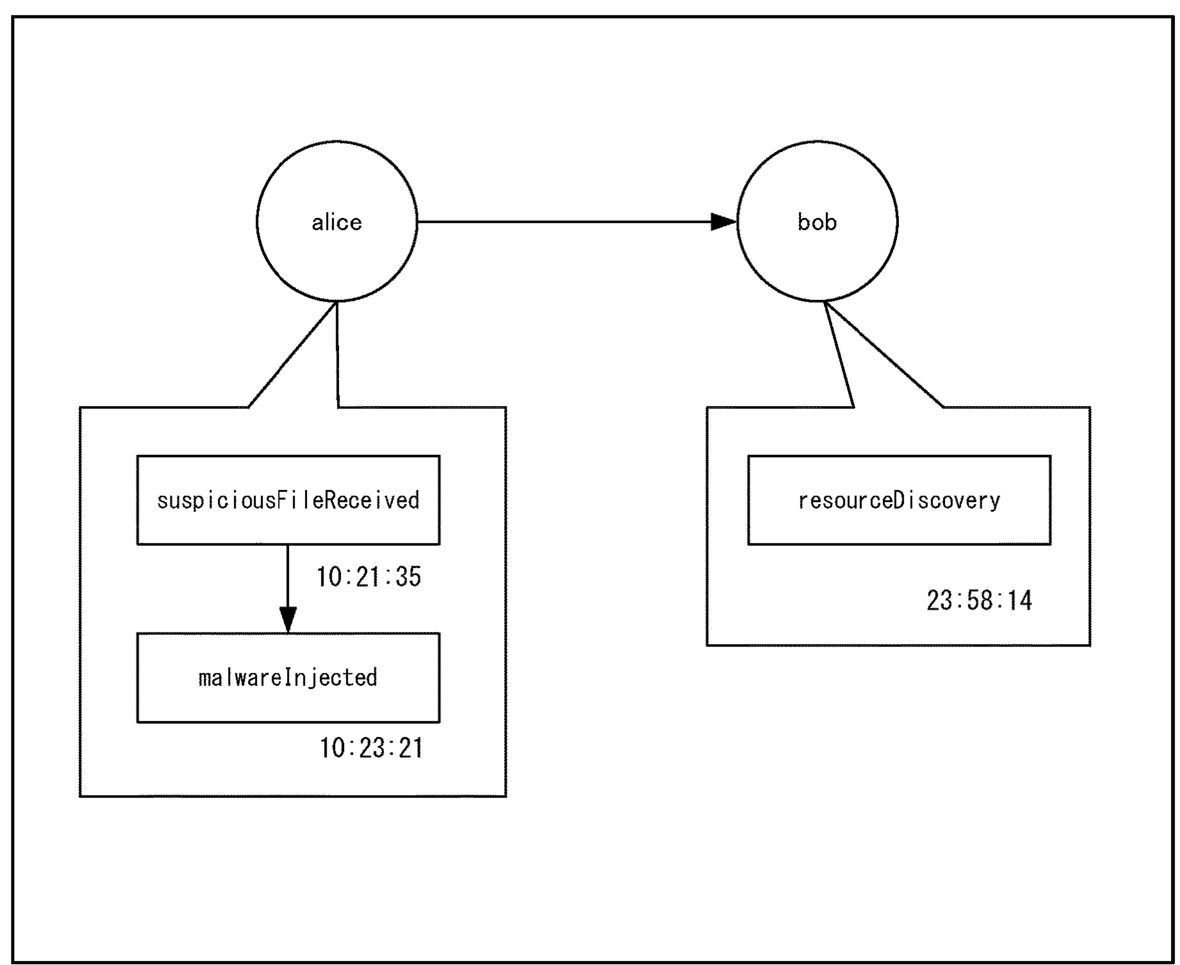
FIG. 8 is a diagram illustrating an example of the directed graph generated in the specific example.

The graph generating unit 13 first extracts, from the TTPs graph illustrated in FIG. 7, events that have host names specified as locations as an attribute and are in the highest layer, and edges (arrows) between the events. Also, the graph generating unit 13 sets the host names specified as locations as nodes, determines edges between the nodes based on the edges between the events, and with this, creates the directed graph illustrated in FIG. 8. Specifically, the edges between the nodes are determined based on information (movement origin, movement destination, etc.) that an event "lateralMovement" has. FIG. 8 is a diagram illustrating an example of the directed graph generated in the specific example.

Step A5

Figure 9:
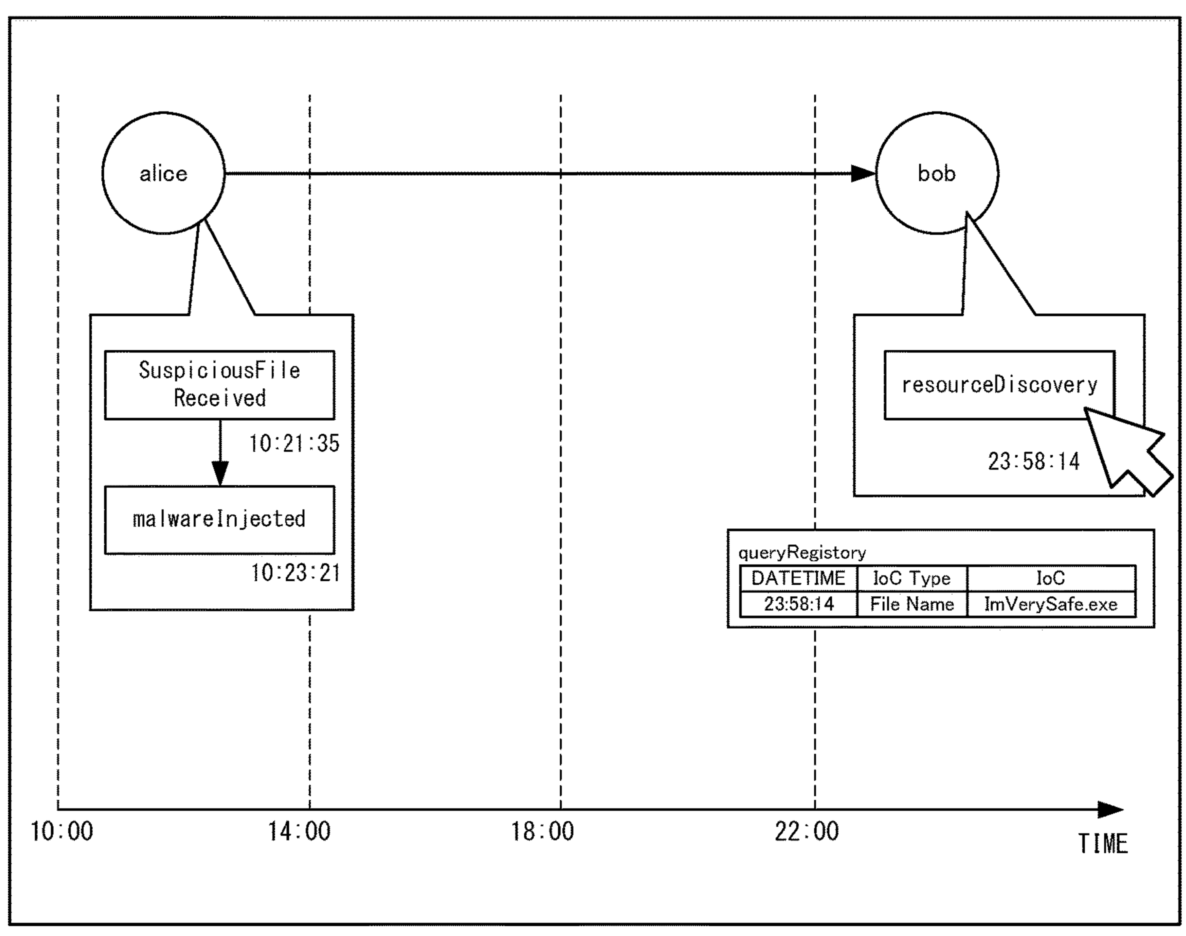
FIG. 9 is a diagram illustrating an example of the display screen in the specific example.

The graph displaying unit 14 displays the directed graph illustrated in FIG. 8 on a screen. Here, the graph displaying unit 14 extracts, for each node (terminal device) in the directed graph, time from a literal of an observed event, and specifies the earliest time from the extracted times. Also, the graph displaying unit 14 displays a time axis on the screen, as illustrated in FIG. 9, and also arranges the nodes on the time axis according to the specified times. FIG. 9 is a diagram illustrating an example of the display screen in the specific example.

Also, the graph displaying unit 14 also arranges, for each node, the events extracted in step A4 on the screen. Moreover, when a user performs an operation to select a node on the screen, the graph displaying unit 14 can display a literal related to the selected node, or can display values (e.g., IoC value illustrated in FIG. 9) of arguments (attribute) included in the literal.

Effects in Example Embodiment

As described above, according to the example embodiment, a directed graph representing the TTPs and the locations that have received attacks is displayed. Therefore, a user such as an administrator of a computer system can understand the "flow of cyberattack", "locations at which malware acts and locations where the influence of the attack appears", and "how the attack spreads" at the same time. Also, in the example embodiment, a user can instantly understand the correspondence relationships in a cyberattack, that is, what happened in what terminal device, for example.

Moreover, as illustrated in FIG. 9, the user can also understand the terminal device that is receiving a cyberattack and IoC of literals that constitute the observation data, and therefore can easily analyze the cyberattack and take a countermeasure against the cyberattack. According to the example embodiment, comprehensive information that is useful when handling an incident can be directly provided to the user.

Program

It suffices for the program in the example embodiment to be a program that causes a computer to carry out steps A1 to A5 illustrated in FIG. 3. By installing this program on a computer and executing the program, the information visualization 10 apparatus and the information visualization method in the example embodiment can be realized. In this case, one or more processors of the computer function and perform processing as the inferring unit 11, the location identification unit 12, the graph generating unit 13, the graph displaying unit 14 and the observation data acquiring unit 15. Furthermore, besides a general-purpose PC, a smartphone and a tablet-type terminal device can be mentioned as examples of the computer.

The program in the example embodiment may be executed by a computer system constructed from a plurality of computers. In this case, the computers may each function as one of the inferring unit 11, the location identification unit 12, the graph generating unit 13, the graph displaying unit 14 and the observation data acquiring unit 15, for example.

Physical Configuration

Figure 10:
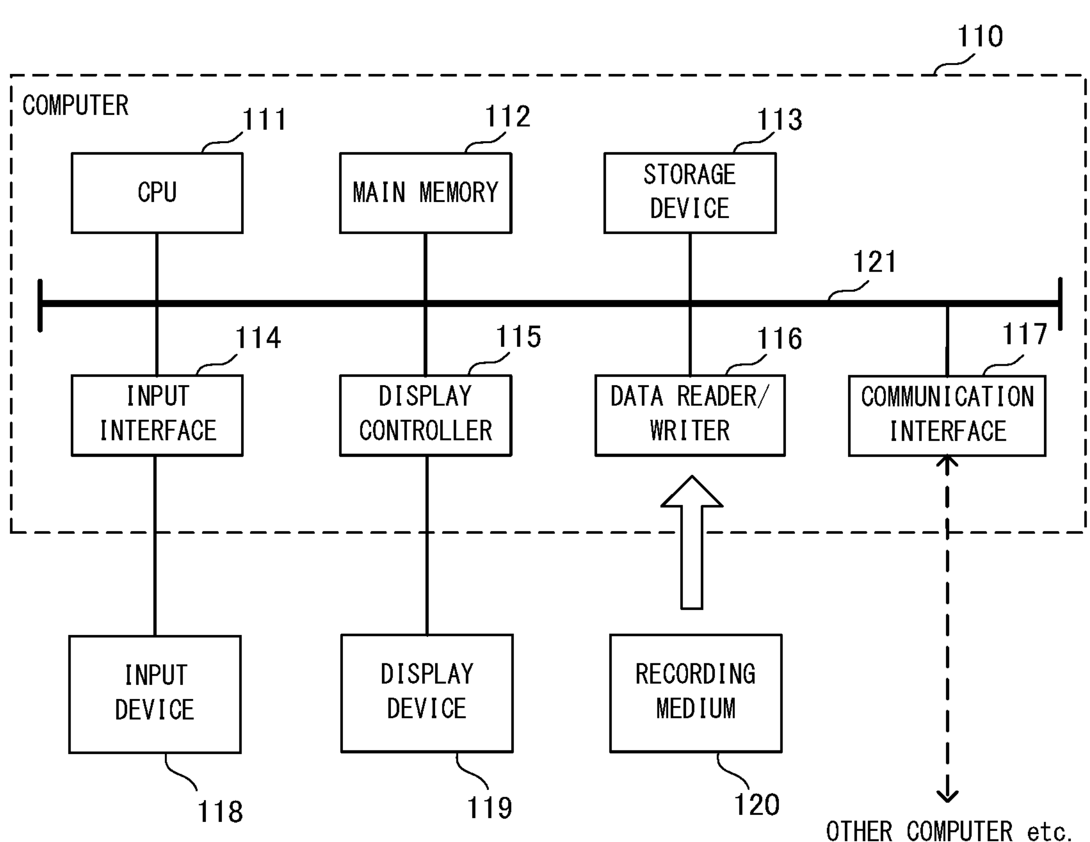
FIG. 10 is a block diagram illustrating an example of a computer that realizes the information visualization apparatus according to the example embodiment.

Using FIG. 10, the following describes a computer that realizes the information visualization apparatus by executing the program according to the example embodiment. FIG. 10 is a block diagram illustrating an example of a computer that realizes the information visualization apparatus according to the example embodiment.

As illustrated in FIG. 12, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121.

The computer 110 may include a GPU (Graphics Processing Unit) or an FPGA (Field-Programmable Gate Array) in addition to the CPU 111, or in place of the CPU 111. In this case, the GPU or the FPGA can execute the program according to the example embodiment.

The CPU 111 deploys the program according to the example embodiment, which is composed of a code group stored in the storage device 113 to the main memory 112, and carries out various types of calculation by executing the codes in a predetermined order. The main memory 112 is typically a volatile storage device, such as a DRAM (dynamic random-access memory).

Also, the program according to the example embodiment is provided in a state where it is stored in a computer-readable recording medium 120. Note that the program according to the first and second example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the information visualization apparatus 10 according to the example embodiment can also be realized by using items of hardware, such as a circuit that respectively correspond to the components rather than the computer in which the program is installed. Furthermore, a part of the information visualization apparatus 10 may be realized by the program, and the remaining part of the information visualization apparatus 10 may be realized by hardware.

A part or an entirety of the above-described example embodiment can be represented by (Supplementary Note 1) to (Supplementary Note 15) described below but is not limited to the description below.

Supplementary Note 1

An information visualization apparatus comprising:

an inference unit that infers, using observation data representing events observed at a time of a cyberattack to a computer system and inferential knowledge, details of the cyberattack;

a location identification unit that identifies locations at which the events have been observed in the computer system, from the observation data;

a graph generation unit that generates a directed graph in which the specified locations are nodes, and edges are set between the nodes based on the observation data or the inferred details; and a graph display unit that displays the directed graph.

Supplementary Note 2

The information visualization apparatus according to Supplementary Note 1, wherein the inference unit infers a tactic, a technique, and a procedure in the cyberattack as details of the cyberattack, the location identification unit identifies locations at which the events have been observed using the observation data that is evidence of the tactic or the observation data that is evidence of the technique, and the graph generation means sets the edges based on the observation data including information representing two or more of the locations, or the inferred procedure.

Supplementary Note 3

The information visualization apparatus according to Supplementary Note 2, wherein the graph display unit displays the directed graph in a state in which, to each node, the tactic or the technique whose reason is the observation data used to specify the location of the node is added.

Supplementary Note 4

The information visualization apparatus according to Supplementary Note 3, wherein the graph display unit displays, for each node or each tactic in the directed graph, the corresponding observation data.

Supplementary Note 5

The information visualization apparatus according to any of Supplementary Notes 1 to 4, wherein the graph display unit displays a time axis on a screen, and displays, when displaying the directed graph, the nodes on the time axis based on time information included in the observation data used to specify the nodes.

Supplementary Note 6

An information visualization method comprising:

an inference step of inferring, using observation data representing events observed at a time of a cyberattack to a computer system and inferential knowledge, details of the cyberattack;

a location identification step of specifying locations at which the events have been observed in the computer system, from the observation data;

a graph generation step of generating a directed graph in which the specified locations are nodes, and edges are set between the nodes based on the observation data or the inferred details; and a graph display step of displaying the directed graph.

Supplementary Note 7

The information visualization method according to Supplementary Note 6, wherein, in the inference step, a tactic, a technique, and a procedure in the cyberattack are inferred as details of the cyberattack, in the location identification step, locations at which the events have been observed are specified using the observation data that is evidence of the tactic or the observation data that is evidence of the technique, and in the graph generation step, the edges are set based on the observation data including information representing two or more of the locations, or the inferred procedure.

Supplementary Note 8

The information visualization method according to Supplementary Note 7, wherein, in the graph generation step, the directed graph is displayed in a state in which, to each node, the tactic or the technique whose reason is the observation data used to specify the location of the node is added.

Supplementary Note 9

The information visualization method according to Supplementary Note 8, wherein, in the graph generation step, for each node or each tactic in the directed graph, the corresponding observation data is displayed.

Supplementary Note 10

The information visualization method according to any of Supplementary Notes 6 to 9, wherein, in the graph generation step, a time axis is displayed on a screen, and when displaying the directed graph, the nodes are displayed on the time axis based on time information included in the observation data used to specify the nodes.

Supplementary Note 11

A computer-readable recording medium that includes a program including instructions recorded thereon, the instructions causing a computer to carry out:

an inference step of inferring, using observation data representing events observed at a time of a cyberattack to a computer system and inferential knowledge, details of the cyberattack;

a graph generation step of specifying locations at which the events have been observed in the computer system, from the observation data;

a graph generation step of generating a directed graph in which the specified locations are nodes, and edges are set between the nodes based on the observation data or the inferred details; and a graph display step of displaying the directed graph.

Supplementary Note 12

The computer-readable recording medium according to Supplementary Note 11, wherein, in the inference step, a tactic, a technique, and a procedure in the cyberattack are inferred as details of the cyberattack, in the location identification step specifying locations, locations at which the events have been observed are specified using the observation data that is evidence of the tactic or the observation data that is evidence of the technique, and in the graph generation step, the edges are set based on the observation data including information representing two or more of the locations, or the inferred procedure.

Supplementary Note 13

The computer-readable recording medium according to Supplementary Note 12, wherein, in the graph generation step, the directed graph is displayed in a state in which, to each node, the tactic or the technique whose reason is the observation data used to specify the location of the node is added.

Supplementary Note 14

The computer-readable recording medium according to Supplementary Note 13, wherein, in the graph generation step, for each node or each tactic in the directed graph, the corresponding observation data is displayed.

Supplementary Note 15

The computer-readable recording medium according to any of Supplementary Notes 11 to 14, wherein, in the graph generation step, a time axis is displayed on a screen, and when displaying the directed graph, the nodes are displayed on the time axis based on time information included in the observation data used to specify the nodes.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

INDUSTRIAL APPLICABILITY

According to the invention, it is possible to visualize the details of a cyberattack. The present invention is useful for various computer systems.

REFERENCE SIGNS LIST

| | |
|---|---|
| 10 | Information visualization apparatus |
| 11 | Inferring unit |
| 12 | Location identification unit |
| 13 | Graph generating unit |
| 14 | Graph displaying unit |
| 15 | Observation data acquiring unit |
| 20 | Inferential knowledge database |
| 30 | Computer system |
| 40 | Display device |
| 110 | Computer |
| 111 | CPU |
| 112 | Main memory |
| 113 | Storage device |
| 114 | Input interface |
| 115 | Display controller |
| 116 | Data reader/writer |
| 117 | Communication interface |
| 118 | Input device |
| 119 | Display device |
| 120 | Recording medium |
| 121 | Bus |

What is claimed is:

1. An information visualization method comprising:

inferring, using observation data representing events observed at a time of a cyber attack to a computer system and inferential knowledge, details of the cyber attack, wherein the observation data comprises first-order predicate logic formulas representing operation logs collected from a plurality of terminal devices;

identifying locations at which the events have been observed in the computer system, from the observation data;

inferring a tactic, a technique, and a procedure in the cyber attack as details of the cyber attack;

identifying locations at which the events have been observed using the observation data that is evidence of the tactic or the observation data that is evidence of the technique;

generating a directed graph in which the specified locations are nodes, and edges are set between the nodes based on the observation data or the inferred details, wherein the edges are set based on the observation data including information representing two or more of the locations, or the inferred procedure;

displaying a time axis and the directed graph on a screen, wherein the nodes of the directed graph are arranged on the time axis based on time information included in the observation data used to specify the nodes;

based on selection of a node of the directed graph, additionally displaying information based on the observation data related to the selected node; and constructing a hierarchical structure of events by setting a lowest layer by literals representing observed events and setting higher layers using consequences included in rules representing relationships between events.

2. A non-transitory computer-readable recording medium that includes a program including instructions recorded thereon, the instructions causing a computer to carry out:

inferring, using observation data representing events observed at a time of a cyber attack to a computer system and inferential knowledge, details of the cyber attack, wherein the observation data comprises first-order predicate logic formulas representing operation logs collected from a plurality of terminal devices;

identifying locations at which the events have been observed in the computer system, from the observation data;

inferring a tactic, a technique, and a procedure in the cyber attack as details of the cyber attack;

identifying locations at which the events have been observed using the observation data that is evidence of the tactic or the observation data that is evidence of the technique;

generating a directed graph in which the specified locations are nodes, and edges are set between the nodes based on the observation data or the inferred details, wherein the edges are set based on the observation data including information representing two or more of the locations, or the inferred procedure;

displaying a time axis and the directed graph on a screen, wherein the nodes of the directed graph are arranged on the time axis based on time information included in the observation data used to specify the nodes;

based on selection of a node of the directed graph, additionally displaying information based on the observation data related to the selected node; and constructing a hierarchical structure of events by setting a lowest layer by literals representing observed events and setting higher layers using consequences included in rules representing relationships between events.

3. An information visualization apparatus comprising:

at least one memory storing instructions; and at least one processor configured to execute the instructions to:

infer, using observation data representing events observed at a time of a cyber attack to a computer system and inferential knowledge, details of the cyber attack, wherein the observation data comprises first-order predicate logic formulas representing operation logs collected from a plurality of terminal devices;

identify locations at which the events have been observed in the computer system, from the observation data;

infer a tactic, a technique, and a procedure in the cyber attack as details of the cyber attack;

identify locations at which the events have been observed using the observation data that is evidence of the tactic or the observation data that is evidence of the technique;

generate a directed graph in which the specified locations are nodes, and edges are set between the nodes based on the observation data or the inferred details, wherein the edges are set based on the observation data including information representing two or more of the locations, or the inferred procedure;

display a time axis and the directed graph on a screen, wherein the nodes of the directed graph are arranged on the time axis based on time information included in the observation data used to specify the nodes;

based on selection of a node of the directed graph, additionally display information based on the observation data related to the selected node; and construct a hierarchical structure of events by setting a lowest layer by literals representing observed events and setting higher layers using consequences included in rules representing relationships between events.

* * * * *